Figure 1:
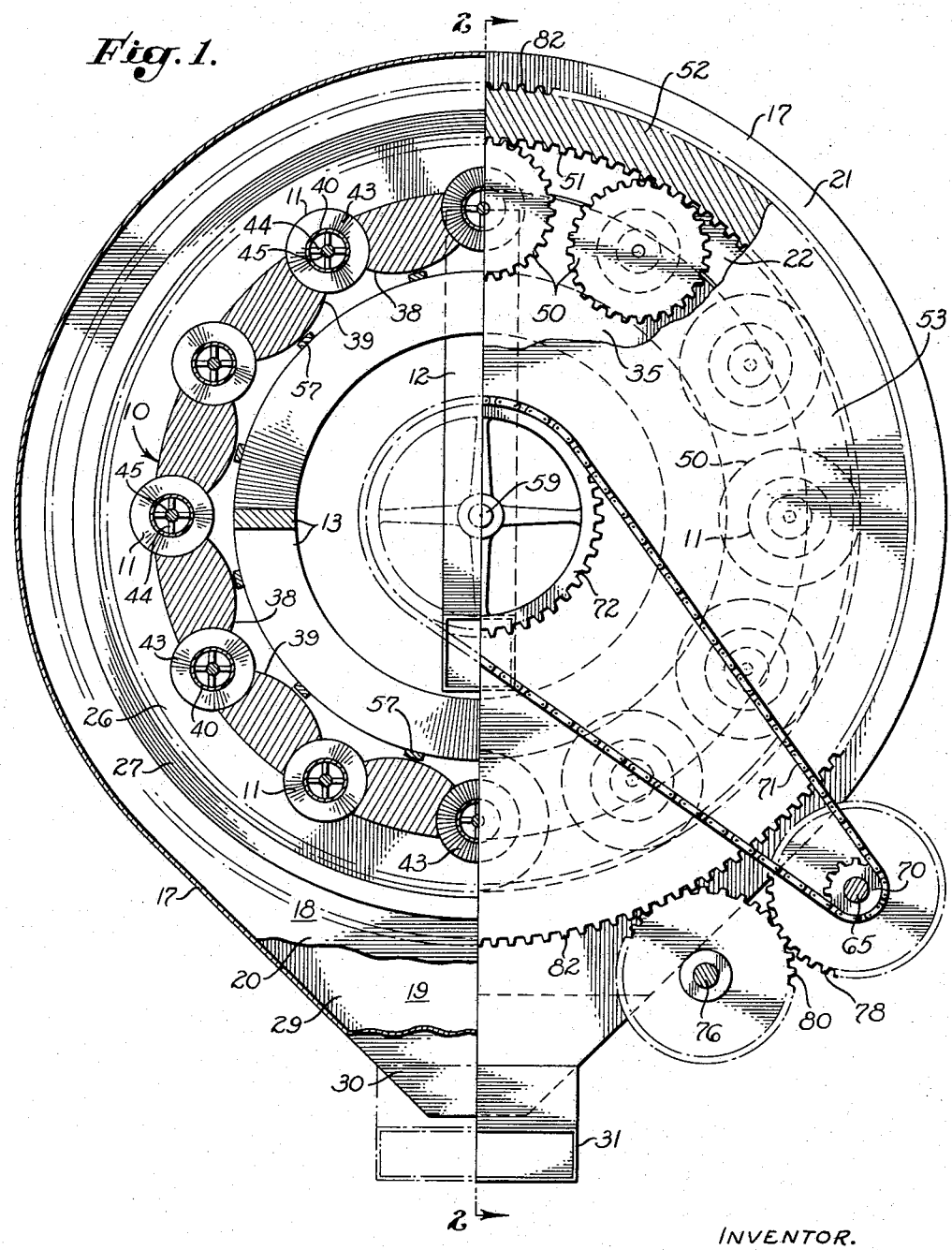

Sept. 20, 1955 W. E. SAXE 2,718,309
CENTRIFUGAL DEHYDRATOR
Filed Sept. 13, 1951 2 Sheets-Sheet 1

INVENTOR.
WALTER E. SAXE
BY HIS ATTORNEYS.
HARRIS, KIECH, FOSTER & HARRIS

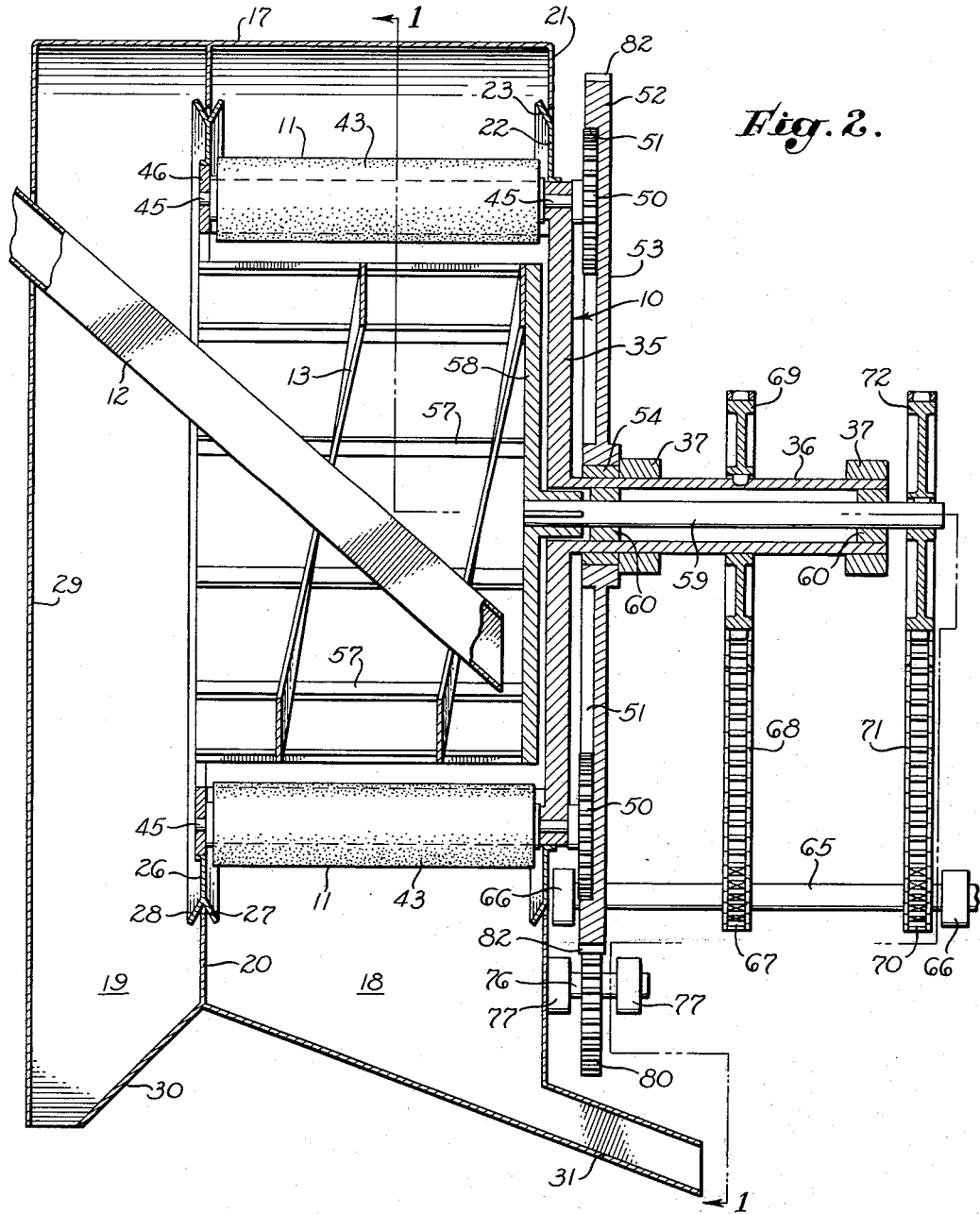

United States Patent Office 2,718,309
Patented Sept. 20, 1955

2,718,309

CENTRIFUGAL DEHYDRATOR

Walter E. Saxe, Pasadena, Calif., assignor to The Conveyor Company, Inc., Los Angeles, Calif., a corporation of California Application September 13, 1951, Serial No. 246,477

13 Claims. (Cl. 210—69)

This invention relates to centrifugal dehydrators for reducing the liquid content of moist masses of granular material. For the purpose of disclosure, the invention will be described herein as embodied in a continuous-process apparatus for drying wet sand, it being apparent however that the principles of the invention are widely applicable for de-watering pulps.

In a continuous dehydrator of this general type, the material in process is thrown centrifugally against a water-pervious supporting means which acts as a filter means or screen to hold back the pulp but releases the extracted liquid. The maintenance of such a filter means in efficient operation over long service periods is a major problem because it tends to clog up and deteriorate rapidly with corresponding loss in efficiency. Frequent replacement of the filter means is expensive not only in the cost of the filtering material but also in the loss of production time. On the other hand, extensive production runs to avoid such expense usually result in a poorly processed product.

The general object of my invention is to meet this problem and to achieve high dehydration efficiency as well as uniformity of product with long production runs. In achieving this general object, the invention takes into account the fact that any screen or filter means in continuous service will inevitably become clogged and drop in efficiency. The invention accomplishes its purpose, in effect, by arranging for the filter means to be repeatedly withdrawn from service automatically for short periods of renovation without interrupting the operation of the centrifuge. To this end the filter means is movably mounted on the centrifuge to operate in a self-cleaning cycle in which the screening means continually progresses through both an operating zone and a cleaning zone so that there is always a portion of the filter means in service but any given working portion continually alternates between these two zones.

While such alternation may be brought about by reciprocation of the filtering means, preferably it is accomplished by movement of the filtering means in a closed path, and in the present embodiment of the invention the filtering means continually rotates in a simple circular path with a portion of the path in the operating zone for filtering action and another portion of the circular path in a cleaning zone for automatic release of any clogging material adhering thereto. Various forms of filtering means may be used in various practices of the invention, but a brush type filtering medium is preferred. In the present embodiment of the invention, a plurality of rotary brushes serves the purpose.

A feature of the preferred practice of the invention is the manner in which certain inherent factors work together for effective automatic cleaning of the revolving brushes, as will be explained.

The various objects and advantages of the invention will be readily understood from the following detailed description of the preferred embodiment of the invention taken with the accompanying drawings.

In the drawings, which are to be regarded as merely illustrative:

Fig. 1 is a view of the preferred form of the apparatus partly in side elevation and partly in section taken as indicated by the line 1—1 of Fig. 2; and Fig. 2 is a longitudinal section taken as indicated by the line 2—2 of Fig. 1.

The principal parts of the apparatus include a rotary shell generally designated 10 having a plurality of longitudinal, peripheral openings occupied by corresponding rotary brushes 11, a feed chute 12 to deliver wet sand into one end of the rotary shell and a screw or helical blade 13 to continually shift the sand in process to the opposite end of the rotary shell. The shell 10 rotates at sufficient speed for the desired centrifugal effect to cause the water content of the sand to be released through the brushes 11.

This general arrangement is surrounded by a casing 17 having two compartments 18 and 19 separated by a partition 20. The rotary shell 10 extends through a circular opening in an outside wall 21 of the compartment 18 and also extends into a circular opening in the partition 20. Preferably the rotary shell 10 carries a radial sheet metal ring 22 in the plane of the outside wall 21 to close the circular opening therein, the sheet metal ring having a peripheral portion 23 offset inwardly from the casing wall 21 to make certain that material released centrifugally from the rotary shell is directed into the compartment 18. In similar manner, a second radial sheet metal ring 26 is carried by the rotary shell 10 in the plane of the partition 20, this second ring having two peripheral portions 27 and 28 offset to opposite sides of the partition 20. The feed chute 12 is inclined downward through an outer wall 29 of the casing compartment 19 into the interior of the rotary shell as shown in Fig. 2. It can be seen that dry sand will pass from the open end of the rotary shell 10 into the compartment 19 for gravity discharge through a spout 30 at the bottom of the compartment and that water together with a minor portion of the sand will be released centrifugally into the compartment 18 for gravity discharge through a lower spout 31.

The working parts of the apparatus may be supported and actuated in various ways. In the particular arrangement shown in the drawings, the rotary shell 10 has a relatively heavy end wall 35 that is carried by a rotary hollow shaft 36, the rotary shaft being journalled in a pair of suitably supported bearings 37. The rotary shell 10 may be relatively heavy for a desirable flywheel effect.

Preferably the inner circumferential wall of the rotary shell 10 is formed with a plurality of portions 38 and 39 that respectively slope from opposite sides toward each of the peripheral openings in which the brushes 11 are mounted. Thus each of the openings in the periphery of the rotary shell in which a brush 11 rotates has a converging entrance, the converging space of the entrance lying outside the circumference of the helical blade 13.

Each of the rotary brushes 11 may comprise, for example, a small metal cylinder 40 carrying a uniform mass of radically extending wire bristles 43. In the construction shown, each of the brush cylinders 40 is mounted by spokes 44 on a shaft 45 and each of the shafts 45 is journalled at one end in the end wall 35 of the rotary shell 10 and is journalled at its other end in a radial flange 46 that is carried by the outer end of the rotary shell. The plurality of brushes 11 may be actuated by any suitable arrangement and preferably are rotated relatively slowly. For this purpose the rotary shell 10 may carry at least one pinion for actuation by a ring gear separate and apart from the rotary shell. In the particular construction shown in the drawings, each of the brush shafts 45 carries a pinion 50 on the outer side of the end wall 35 and each of these pinions is in mesh with the inner teeth 51 of a suitable ring gear 52. The ring gear 52 has a supporting web 53 and is rotatably mounted on the previously mentioned hollow shaft 36 by a suitable bearing 54.

The helical blade 13 that gradually shifts the drying sand in the rotary shell 10 towards the discharge compartment 19 may be supported along its periphery by a circular series of longitudinal bars 57 carried by a rotating disc or circular plate 58. In the construction shown the circular plate 58 is supported concentrically by a solid shaft 59 that extends outward through two bearings 60 mounted inside the hollow shaft 36.

It is apparent that the hollow shaft 36, the ring gear 52 that is journalled thereon and the inner shaft 59 may be independently rotated to drive the rotary shell 10, the rotary brushes 11 and the helical blade 13 respectively at any desired relative speeds to carry out the purpose of the apparatus.

In the preferred practice of the invention these various working parts are actuated by a suitably powered drive shaft 65 mounted in suitably supported bearings 66. A sprocket 67 on the drive shaft 65 is connected by a chain belt 68 with a larger sprocket 69 on the hollow shaft 36 to drive the rotary shell 10. A second sprocket 70 on the drive shaft 65 is operatively connected by a chain belt 71 with a sprocket 72 on the inner shaft 59 to rotate the helical blade 13.

For relatively slow rotation of the brushes 11 by means of the ring gear 52, the ring gear should be driven in the same rotary direction as the rotary shell 10 but at a slightly lesser or greater rate. To this end I provide a countershaft 76 journalled in a pair of suitably supported bearings 77 and provide a gear 78 on the drive shaft 65 in mesh with a second gear 80 on the countershaft. The gear 80, in turn, is in mesh with external teeth 82 on the ring gear 52 to rotate the ring gear in the desired direction at the desired rate.

In a typical installation of the apparatus, the various speeds of the working parts may be, for example, 100 R. P. M. for the rotary shell 10, 102 R. P. M. for the helical blade 13 and 99 R. P. M. for the ring gear 52, all three, of course, being rotated in the same direction. The essential fact is that the helical blade 13 and the ring gear 52 rotate at speeds differing slightly from the speed of the rotary shell 10. At these relative speeds, it is contemplated that the brushes 11 will rotate at approximately 4 R. P. M. by virtue of the ratio between the diameter of each pinion 50 and the inner diameter of the ring gear 52.

The operation of the dehydrating apparatus may be readily understood from the foregoing description. The water-laden sand fed continuously through the chute 12 into one end of the rotary shell 10 is gradually shifted by the helical blade 13 to the discharge end for gravitation through the compartment 19 to the discharge chute 30. By the time the sand in process has reached the discharge compartment 19 the sand is relatively dry since most of the water is screened through the brushes 11. The water together with a small amount of sand that is released by the brushes 11 is collected by the surrounding walls of the compartment 18 for discharge through the spout 31 and this small amount of sand is collected and recirculated. With the various working parts operating at the specified speeds and the rotary shell 10 having the dimensions of four feet in diameter and three feet in length, the described apparatus will generate a centrifugal force of nearly seven times gravity and process approximately 48 tons of sand per hour.

The factors that work together to favor effective self-cleaning action by the brushes 11 may be understood when it is considered that the brushes are carried in a circular orbit about the axes of the rotary shell 10 with the outer or cleaning zones of the brushes travelling on a greater diameter than the inner or operating zones of the brushes. It is apparent that the centrifugal force that tends to dislodge particles from the outwardly turned bristles of the brushes is substantially greater than the centrifugal force that tends to drive the particles into the inwardly turned bristles. A further consideration is that the bristles of the brushes in the outer cleaning zone diverge radially outward to favor release of the particles lodged between the bristles.

A further factor is the action of the water itself since the water flowing outward on the outwardly directed bristles of the brushes is accelerated by the relatively high centrifugal force prevailing in the outer reaches of the bristles and, of course, the streaming water acts effectively upon the particles lodged among the bristles. There is some reason to believe, furthermore, that gravity is important since in the lower quadrant of the circular orbit gravity combines with centrifugal force to dislodge particles in the brushes. In time each peripheral portion of a rotating brush has the benefit of these combined forces as the brush repeatedly swings through this lower quadrant.

My detailed description herein of the presently preferred form of the invention will suggest to those skilled in the art various changes, substitutions and departures from my disclosure that properly lie within the scope and spirit of my appended claims. For example, it is apparent that the apparatus may be built with the rotary shell positioned upright to rotate about a more or less vertical axis.

I claim as my invention:

1. In a centrifuge apparatus for dehydrating pulp, the combination of: a driven rotary shell to receive the pulp, said shell having peripheral openings; water-pervious filter means movably carried by said shell to restrain movement of the pulp through said openings, said filter means having inwardly facing portions at operating positions spanning said openings and having other portions at cleaning positions facing outward from the shell for the release of particles therefrom by centrifugal force; means to move said water-pervious filter means in a cyclic manner during rotation of said shell to cause portions thereof to continually alternate between said two positions; and means to move the pulp axially of said shell.

2. In a centrifuge apparatus for dehydrating pulp, the combination of: a driven rotary shell to receive the pulp, said shell having peripheral openings; water-pervious means of circular configuration corresponding to each of said openings, each of said water-pervious means having an inwardly facing peripheral portion spanning the corresponding opening and another peripheral portion facing outward from the rotary shell for the release of particles therefrom by centrifugal force, said water-pervious means being substantially impervious to passage therethrough of the pulp; means to rotate each of said water-pervious means about its axis while said shell is rotating; and means to move the pulp axially of said shell.

3. A centrifuge apparatus as set forth in claim 1 in which said shell rotates on a substantially horizontal axis whereby gravity periodically combines with centrifugal force to dislodge particles from said water-pervious means at said cleaning positions of the water-pervious means.

4. In a centrifuge apparatus for dehydrating pulp, the combination of: a rotary shell to receive the pulp, said shell having peripheral openings; brush means carried by said shell, said brush means having bristles movable from inner filtering positions in said openings with the bristles turned inward to outer positions with the bristles turned outward from said shell; means to rotate said shell to drive water from the pulp through said openings by centrifugal force; and means to actuate said brush means to move said bristles repeatedly from said inner filtering positions to said outer positions for cleaning of the bristles by centrifugal action while said shell is rotating.

5. A centrifuge apparatus as set forth in claim 4 in which said bristles are positioned along closed paths and are movable along the closed paths.

6. In a centrifuge apparatus for dehydrating pulp, the combination of: a rotary shell to receive the pulp, said shell having peripheral openings; a plurality of rotary brushes mounted on said shell across said openings to confine the pulp in the shell but pass liquid extracted therefrom; means to rotate said shell to drive liquid from the pulp through said openings by centrifugal force; and means to rotate said brushes while the shell is rotating thereby repeatedly moving the bristles of the brushes from inner filtering positions to outer positions for cleaning of the bristles by centrifugal action.

7. A centrifuge apparatus as set forth in claim 6 in which the inner wall of said shell slopes toward each of said openings from opposite sides thereof to provide spaces converging toward said brushes.

8. A centrifuge apparatus as set forth in claim 6 which includes at least one pinion carried by the shell to rotate said brushes, a ring gear in mesh with said pinion, and means to rotate said ring gear at a speed differing from the speed of rotation of the shell thereby to rotate said brushes.

9. A centrifuge apparatus as set forth in claim 8 in which the last-mentioned means rotates said ring gear in the same rotary direction as said shell at nearly the same speed as the shell to rotate said brushes at relatively low speeds.

10. In a centrifuge apparatus for dehydrating pulp, the combination of: a rotary shell adapted to receive the pulp, said shell having peripheral openings to release liquid extracted from the pulp; a plurality of rotary brushes carried by the shell in positions spanning said openings to restrain movement of the pulp through the openings; means to rotate said shell; a rotary helical screw means extending around the inner circumference of said shell to move the pulp longitudinally of the shell; means to cause relative rotation between said shell and said screw means; and means to rotate said brushes while the shell is rotating.

11. In a centrifuge apparatus for dehydrating pulp, the combination of: a rotary shell adapted to receive the pulp, said shell having peripheral openings to release liquid extracted from the pulp; a plurality of rotary brushes carried by the shell in positions spanning said openings to restrain movement of the pulp through the openings; means to rotate said shell; a rotary helical screw means extending around the inner circumference of said shell to move the pulp longitudinally of the shell; means to cause relative rotation between said shell and said screw means; means including at least one pinion carried by said shell for actuating said brushes; and means apart from the shell and in engagement with said pinion to cause rotation of the brushes when the shell rotates.

12. A centrifuge apparatus as set forth in claim 10 in which the inner wall of said shell slopes toward each of said openings from opposite sides thereof to provide a space converging on each opening between the circumference of said screw means and the circumference defined by the inner sides of said brushes.

13. In a centrifuge apparatus for dehydrating pulp, the combination of: a rotary shell adapted to receive the pulp, said shell having peripheral openings to release liquid extracted from the pulp; a plurality of rotary brushes carried by the shell in positions spanning said openings to restrain movement of the pulp through the openings; means to rotate said shell; a rotary helical screw means extending around the inner circumference of said shell to move the pulp longitudinally of the shell; means to cause relative rotation between said shell and said screw means; means including at least one pinion carried by said shell for actuating said brushes; a ring gear concentric with said shell in mesh with said pinion; and means to rotate said ring gear in the same rotary direction as the shell at a different rate from the shell to cause relatively slow rotation of said brushes about their axes.

References Cited in the file of this patent

UNITED STATES PATENTS

| | | |
|---|---|---|
| 250,418 | Bonnefin | Dec. 6, 1881 |
| 891,271 | Ljungstrom | June 23, 1908 |
| 1,002,677 | Grill | Sept. 5, 1911 |
| 1,595,894 | Klund | Aug. 10, 1926 |
| 1,812,042 | Genter | June 30, 1931 |
| 1,833,315 | Burhans | Nov. 24, 1931 |
| 1,870,971 | Sundstrom et al. | Aug. 9, 1932 |
| 1,933,644 | Trump | Nov. 7, 1933 |
| 1,959,850 | Austin | May 22, 1934 |
| 2,047,808 | Trimbey | July 14, 1936 |
| 2,060,685 | Murphy | Nov. 10, 1936 |
| 2,136,853 | Knecht | Nov. 15, 1938 |
| 2,159,536 | Searle | May 23, 1939 |
| 2,483,200 | Haug | Sept. 27, 1949 |

FOREIGN PATENTS

| | | |
|---|---|---|
| 12,233 of 1900 | Great Britain | May 11, 1901 |
| 233 of 1897 | Great Britain | Mar. 27, 1897 |